United States Patent
Welz

[15] 3,701,474
[45] Oct. 31, 1972

[54] EMERGENCY TRACKAGE FOR VEHICLE WHEELS

[72] Inventor: Rudolf Welz, 122 Ethelbert Street, Winnipeg 10, Manitoba, Canada

[22] Filed: July 16, 1970

[21] Appl. No.: 55,457

[52] U.S. Cl. ..............................238/14, 14/73, 94/5
[51] Int. Cl. ..........................E01b 23/00, E01c 9/10
[58] Field of Search ...................238/14; 94/5; 14/73

[56] References Cited

UNITED STATES PATENTS

| | | | |
|---|---|---|---|
| 1,335,546 | 3/1920 | Bardon | 238/14 |
| 1,347,405 | 7/1920 | Robbins et al. | 238/14 |
| 2,680,567 | 6/1954 | Steven | 238/14 |
| 3,202,358 | 8/1965 | Grinswold | 238/14 |
| 2,479,760 | 8/1949 | Merrick | 238/14 |
| 3,350,013 | 10/1967 | Bergquist | 238/14 |
| 1,375,666 | 4/1921 | Bauer | 238/14 |
| 3,025,002 | 3/1962 | Kunz | 238/14 |
| 3,069,090 | 12/1962 | Ginsberg | 238/14 |
| 3,425,624 | 2/1969 | Jacobs | 238/14 |

Primary Examiner—Gerald M. Forlenza
Assistant Examiner—Richard A. Bertsch
Attorney—Kent & Ade

[57] ABSTRACT

A pair of rectangular dished plates are ring-hinged together at their adjacent edges and each provided with spaced upper cross battens, the second plate also having cross battens thereunder and being similarly hinged to a ground tread having spaced upper and lower cross bars; the first plate is placed in the ground and against the tire of a mired automobile wheel, and when the wheel is driven, it grips the battens to drag the plates thereunder until the plates and ground tread anchor at the ground opening formed by the rotating wheel, and so permit the wheel to ride in and up the track so formed.

1 Claim, 6 Drawing Figures

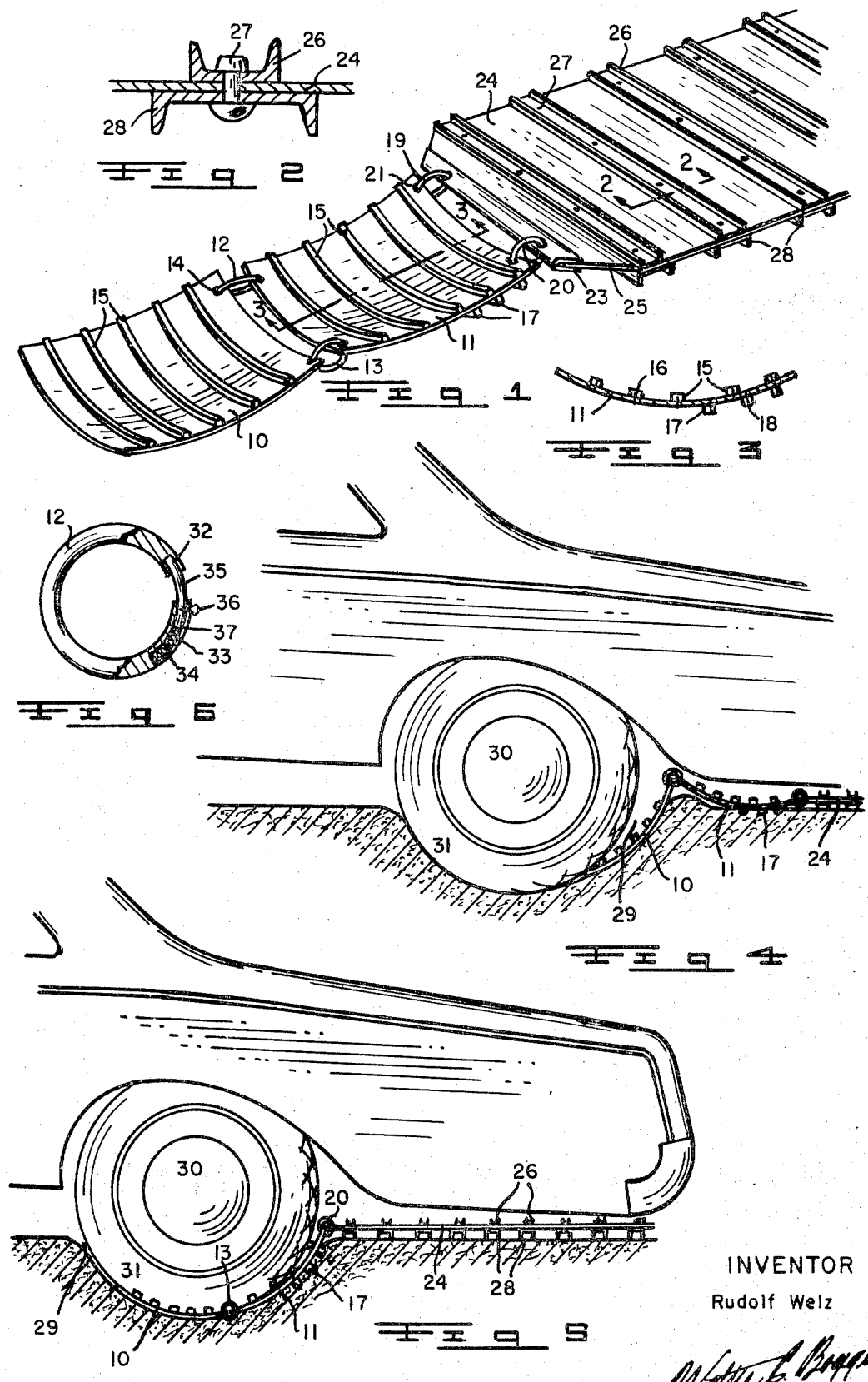

EMERGENCY TRACKAGE FOR VEHICLE WHEELS

This invention relates to trackage means for assisting automotive vehicles out of mudholes, sandtraps and snowbanks. I am well aware that such problems are old and that many inventions have been produced to solve them, with varying success. No one device seems to work correctly under all conditions, the principal difficulty being the inability to get solid support directly under the power operable wheels of the vehicle.

In view of the above, the principal objects of the present invention are: to provide a portable trackage which can be closed and stored on the vehicle; can be opened out and placed against a mired wheel tire and be dragged thereunder in the operation of the wheel, while at the same time the trackage will self-align with the wheel tire and become ground-anchored so the wheel will have a firm grip thereon to lift itself and the vehicle out and onto a solid ground track at surface level.

With the above important and other minor objects in view, which will become more apparent as the description proceeds, the invention consists essentially in the design, construction and arrangement of the various parts hereinafter more particularly described, reference being had to the accompanying drawings wherein:

FIG. 1 is a perspective view of the invention per se.

FIG. 2 is an enlarged section taken on the dot and dash line 2—2 of FIG. 1.

FIG. 3 is an enlarged section taken on the dot an dash line 3—3 of FIG. 1.

FIG. 4 is a partial side view of a mired vehicle and showing the method of positioning the invention for its release.

FIG. 5 is a view similar to FIG. 4 but showing how the invention is drawn down under the vehicle wheel to provide good trackage therefor.

FIG. 6 is a detail of a releasable locking ring.

In the drawings, like characters of reference indicate corresponding parts in the several figures.

A pair of dished rectangular plates 10 and 11 are connected together at one of each of their ends by a pair of spaced rings 12 and 13 which pass through holes 14 in the ends of said plates, and such that they can hinge on each other. These plates are provided with spaced battens 15 thereacross which curve and conform with the curvature of the dished plates and simulate the cross sectional curve of an automobile tire, or in other words; gives a trough-shape effect, while the lengthwise curve of the trough also simulates the outer diametrical curvature of a tire. These battens are suitably secured to the plates such as by rivets, indicated at 16 in FIG. 3.

The second plate 11 is also provided at its under opposite end with three closely spaced anchor battens 17 which conform thereto while being secured to the plate by further rivets, indicated at 18 in FIG. 3. Said opposite end of the second plate 11 is also provided with a pair of spaced rings 19 and 20 which pass through holes 21 in the plate, and also through holes 22 in a bent-over plate 23 of a wider elongated ground tread 24. The forward end of this tread and the plate 23 are tapered from the width of the dished plate 11 to the width of the tread, as shown at 25. By the above arrangement, the plate 11 can hinge on the rings 19 and 20. The tread 24 is also provided with a series of spaced cross members 26 which actually provide the tread and they are secured by rivets 27 to further larger cross members 28 thereunder which are adapted to anchor in the ground when laid thereon. This ground tread may be as long as desired.

The above is the description of the invention which forms the present emergency trackage. Two of such are required, one for each back wheel of a vehicle, and they can be folded on their rings and compactly stored in the trunk of the vehicle, until needed.

When the vehicle becomes bogged down in soft material, such as mud, sand or heavy snow, as shown in FIG. 4, the emergency trackage is removed from the trunk, opened out and positioned as indicated in this Figure. The first plate 10 is passed down the opening 29 formed in the ground by the vehicle wheel 30, with the first batten up against the tire 31 thereof, while the second plate 11 lays on the ground surface as shown, followed by the ground tread 24 which may extend out past the bumper of the vehicle. The driver then places the vehicle in reverse gear and applies the power. As the back wheel turns, the tire grips the first batten mentioned and drags both the plates 10 and 11 therebelow (FIG. 5) as the material of the ground is too soft to offer much resistance, and both plates freely slide therein as they are approximately the same width as the wheel opening 29. This sliding movement continues until the under battens 17 of the second dished plate 11 finds anchorage at the back of the opening, assisted by pressure from the rotating wheel, while the bent over plate 23 and the wider end of the ground tread 24 block the entrance to the opening 29, and lock the trackage against further movement. At the same time the cross members 28 tend to grip the ground and offer further resistance. It will also be noted that, in this power movement, the dished plates 10 and 11, due to their shape, automatically align themselves with the tire of the wheel so they center thereunder as the ground thread 24 is stopped at the wheel opening. Accordingly, any further turning of the wheel on this locked trackage causes said wheel to ride up the battens, and it cannot swerve off due to their cross curvature, so the wheel comes out of the opening onto the track of the ground tread 24 and therealong to firm ground—and safety. The trackages are then picked up, folded, and again stored in the trunk of the vehicle.

While I have shown how the vehicle can be restored to safe ground by placing the trackages behind the rear wheels thereof, it will be appreciated that they could also be placed in front of the rear wheels in the same manner and the wheels driven thereon, when the judgement of the driver so dictates. It will be particularly noted that, due to the locking of the trackage at the entrance to the wheel opening 29, said trackage cannot be swished under the wheel and thrown therefrom, as so often occurs with other devices. With this device a firm track is ensured under the drive wheels and the vehicle must come out of the wheel openings when the power of the motor is applied thereto as the battens on the plates 10 and 11 present a positive tire grip.

It might also be mentioned at this time that the two dished plates 10 and 11 are only provided when the ground surface is particularly wet or oily and the complete sliding of the plates can occur. This is usually an extreme condition and accordingly, I do not wish to be limited to a device using both plates as in the majority of such operations the the one plate 11 with the ground thread 24 is sufficient to handle the job. With such an arrangement the plate 11 is positioned against the tire in the same manner as for plate 10 while releasably attachable rings are used therebetween, such as the one shown in FIG. 6 for example. This ring is a split one and the ends thereof are hollow, as shown at 32 and 33. A coil spring 34 is inserted in the hollow 33 and followed by a curved pin 35 having a manually operable button 36 which rides in a slot 37 of the ring, while the outer end of the pin enters the hollow 32 under the resilience of the spring 34. To release the ring from its retaining plate, the button 36 is pressed down the slot 37 which withdraws the pin and opens the split in the ring. When the button is released the spring returns the pin back into the hollow 32. This construction is merely explanatory and not to be considered in a limiting sense except as defined by the scope of the claims.

What I claim as my invention is:

1. Emergency trackage for vehicle wheels, comprising an articulated set of at least three track members including a leading member, an intermediate member and a trailing member arranged in that order in relation to the direction in which the trackage is applied to a wheel, said leading member having a smooth lower surface devoid of projections and being provided on its upper surface with a set of wheel tire gripping elements, said intermediate member having its leading edge connected to the trailing edge of the leading member and said trailing member having its leading edge connected to the trailing edge of the intermediate member, said intermediate member also being provided on its upper surface with a set of wheel tire gripping elements and all but the trailing edge portion of the lower surface of the intermediate member being smooth and devoid of projections, a set of ground gripping elements provided on said trailing edge portion of the lower surface of the intermediate member, a set of wheel tire gripping elements provided on the upper surface of said trailing member, and a set of ground gripping elements provided on the lower surface of the trailing member, the arrangement being characterized in that when the trackage is applied to a rotating wheel, the smooth lower surfaces of the leading and intermediate members permit these members to be drawn under the wheel until the ground gripping elements on the trailing portion of the intermediate member grip the ground to arrest further movement of the trackage and facilitate travel of the wheel therealong.

* * * * *